United States Patent
Jia et al.

(10) Patent No.: US 12,022,453 B2
(45) Date of Patent: *Jun. 25, 2024

(54) FREQUENCY-AWARE CELLULAR COMMUNICATION NETWORK

(71) Applicant: AT&T Intellectual Property I, L.P., Atlanta, GA (US)

(72) Inventors: Yupeng Jia, Austin, TX (US); Jiansong Wang, Lincroft, NJ (US); Hongyan Lei, Plano, TX (US); Farooq Bari, Kirkland, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,294

(22) Filed: Apr. 4, 2023

(65) Prior Publication Data
US 2023/0247612 A1    Aug. 3, 2023

Related U.S. Application Data

(63) Continuation of application No. 16/881,404, filed on May 22, 2020, now Pat. No. 11,653,342.

(51) Int. Cl.
*H04W 72/0453*    (2023.01)
*H04W 8/08*    (2009.01)

(52) U.S. Cl.
CPC ......... *H04W 72/0453* (2013.01); *H04W 8/08* (2013.01)

(58) Field of Classification Search
CPC ............................ H04W 72/0453; H04W 8/08

USPC ........................................................ 370/329
See application file for complete search history.

(56) References Cited

U.S. PATENT DOCUMENTS

| | | | |
|---|---|---|---|
| 9,445,323 | B1 | 9/2016 | Ramamurthy et al. |
| 10,993,140 | B1 | 4/2021 | Guha et al. |
| 2012/0020231 | A1 | 1/2012 | Chen et al. |
| 2012/0064858 | A1 | 3/2012 | Cai et al. |
| 2013/0223322 | A1 | 8/2013 | Ode |
| 2014/0269441 | A1 | 9/2014 | Hyde et al. |
| 2018/0255507 | A1 | 9/2018 | Nagasaka et al. |
| 2019/0213805 | A1 | 7/2019 | Prakah-Asante et al. |
| 2020/0153740 | A1 | 5/2020 | Singh et al. |
| 2020/0383010 | A1 | 12/2020 | Zhu et al. |

OTHER PUBLICATIONS

Non-Final Office Action received for U.S. Appl. No. 16/881,404 dated Mar. 17, 2022, 44 pages.
Non-Final Office Action received for U.S. Appl. No. 16/881,404 dated Sep. 14, 2022, 33 pages.
Non-Final Office Action received for U.S. Appl. No. 16/881,404 dated Jan. 5, 2023, 31 pages.

*Primary Examiner* — Gbemileke J Onamuti
(74) *Attorney, Agent, or Firm* — Guntin & Gust, PLC; Kenneth S. Kwan

(57) ABSTRACT

The described technology is generally directed towards a frequency-aware cellular communication network. A mobile device, or a radio access network (RAN) device at a base station in communication with the mobile device, can proactively notify a core network device regarding changes of a frequency band used for communications between the mobile device and the base station. The core network can use received notifications to adjust service provided to the mobile device.

20 Claims, 8 Drawing Sheets

---

702
DETECTING, BY RADIO ACCESS NETWORK EQUIPMENT COMPRISING A PROCESSOR, A CHANGE OF A FREQUENCY BAND USED BY A USER EQUIPMENT TO COMMUNICATE WITH THE RADIO ACCESS NETWORK DEVICE

704
IN RESPONSE TO DETECTING THE CHANGE OF THE FREQUENCY BAND, SENDING, BY THE RADIO ACCESS NETWORK EQUIPMENT, A NOTIFICATION TO THE CORE NETWORK EQUIPMENT TO NOTIFY THE CORE NETWORK EQUIPMENT OF THE CHANGE OF THE FREQUENCY BAND USED BY THE USER EQUIPMENT

FREQUENCY-AWARE CELLULAR COMMUNICATION NETWORK

RELATED APPLICATION

The subject patent application is a continuation of, and claims priority to, U.S. patent application Ser. No. 16/881,404, filed May 22, 2020, and entitled "FREQUENCY-AWARE CELLULAR COMMUNICATION NETWORK," the entirety of which priority application is hereby incorporated by reference herein.

TECHNICAL FIELD

The subject application is related to fifth generation (5G) and subsequent generation cellular communication systems.

BACKGROUND

Emerging 5G cellular communication systems will significantly enhance the speed, coverage and responsiveness of wireless networks. At speeds approaching one gigabit per second (Gbps) and beyond, the typical cellular connection could be ten to one hundred times faster than today, and also faster than today's cable internet connections. Furthermore, 5G's very low latency, around twenty times lower than today's typical latencies, is expected to create opportunities for a range of game-changing new technologies, such as connected self-driving vehicles, the "internet of things", and other applications.

The high speed and low latency of 5G is due in part to its use of higher frequencies than previous generation cellular communication systems. However, 5G does not always operate at higher frequencies. Low-band 5G can use a similar frequency range as current fourth generation (4G) technologies, e.g., 600-700 Megahertz (MHz). Mid-band 5G can use a frequency range of, e.g., 2.5-3.7 Gigahertz (GHz). High-band 5G can use a frequency range of, e.g., 25-39 GHz. While the higher frequencies offer faster speeds and lower latencies, the lower frequencies support longer ranges, i.e., longer distances between the antenna and the user. 5G devices can optionally connect to the highest speed antenna within range. In some cases, so called "dual mode" or "non-standalone" devices can communicate with 4G antennas as well as 5G antennas.

The above-described background is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
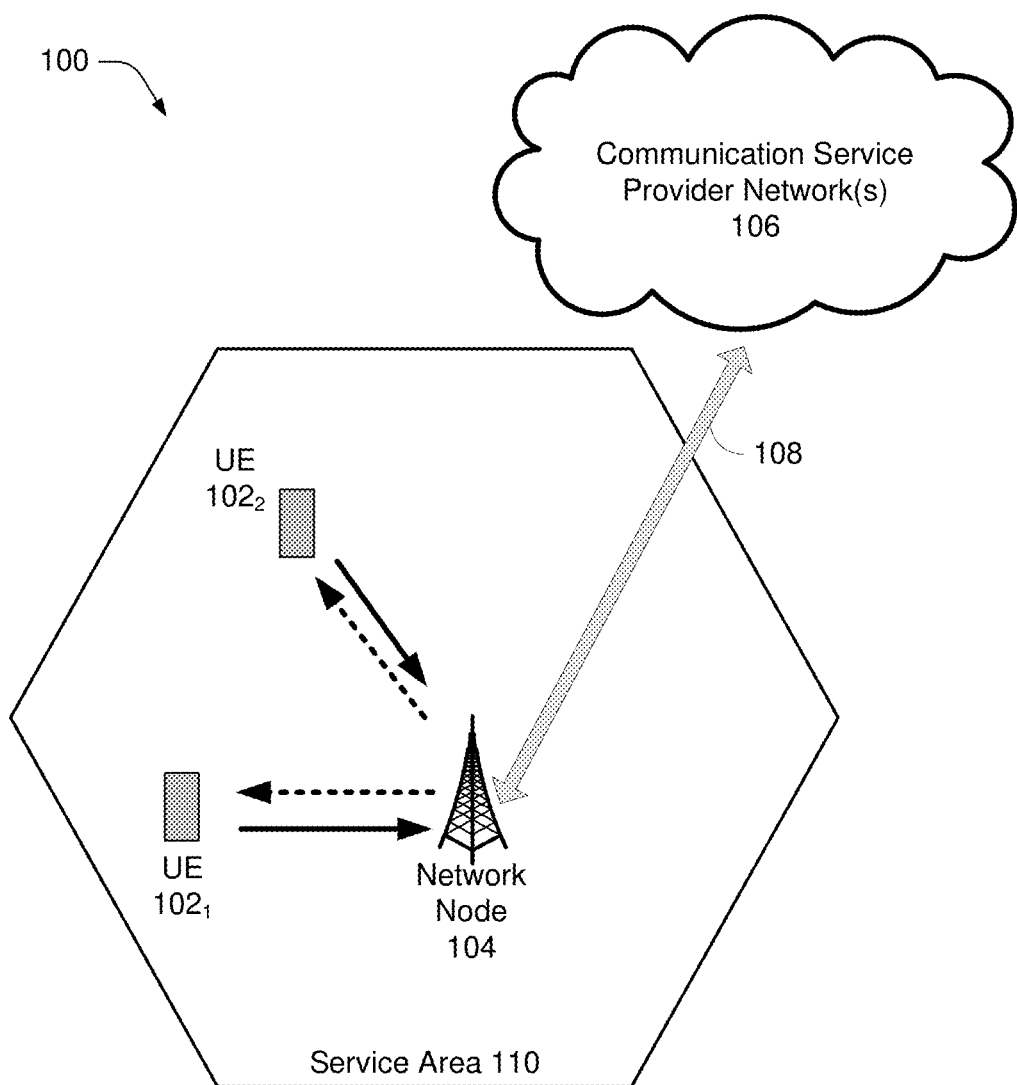
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards a frequency-aware cellular communication network. A mobile device, or a radio access network (RAN) device at a base station in communication with the mobile device, can proactively notify a core network device regarding changes of a frequency band used for communications between the mobile device and the base station. The core network can use received notifications to adjust service provided to the mobile device.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), fifth generation core (5G Core), fifth generation option 3x (5G Option 3x), high speed packet access (HSPA), Z-Wave, Zigbee and other 802.XX wireless technologies and/or legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop MIMO mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, also called sectors, depending on the configuration and type of antenna. In example embodiments, UEs 102 can send and/or receive communication data via a wireless link to the network node 104. The dashed arrow lines from the network node 104 to the UEs 102 represent downlink (DL) communications and the solid arrow lines from the UEs 102 to the network node 104 represents an uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or comprise a large scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). In an embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

Figure 2:
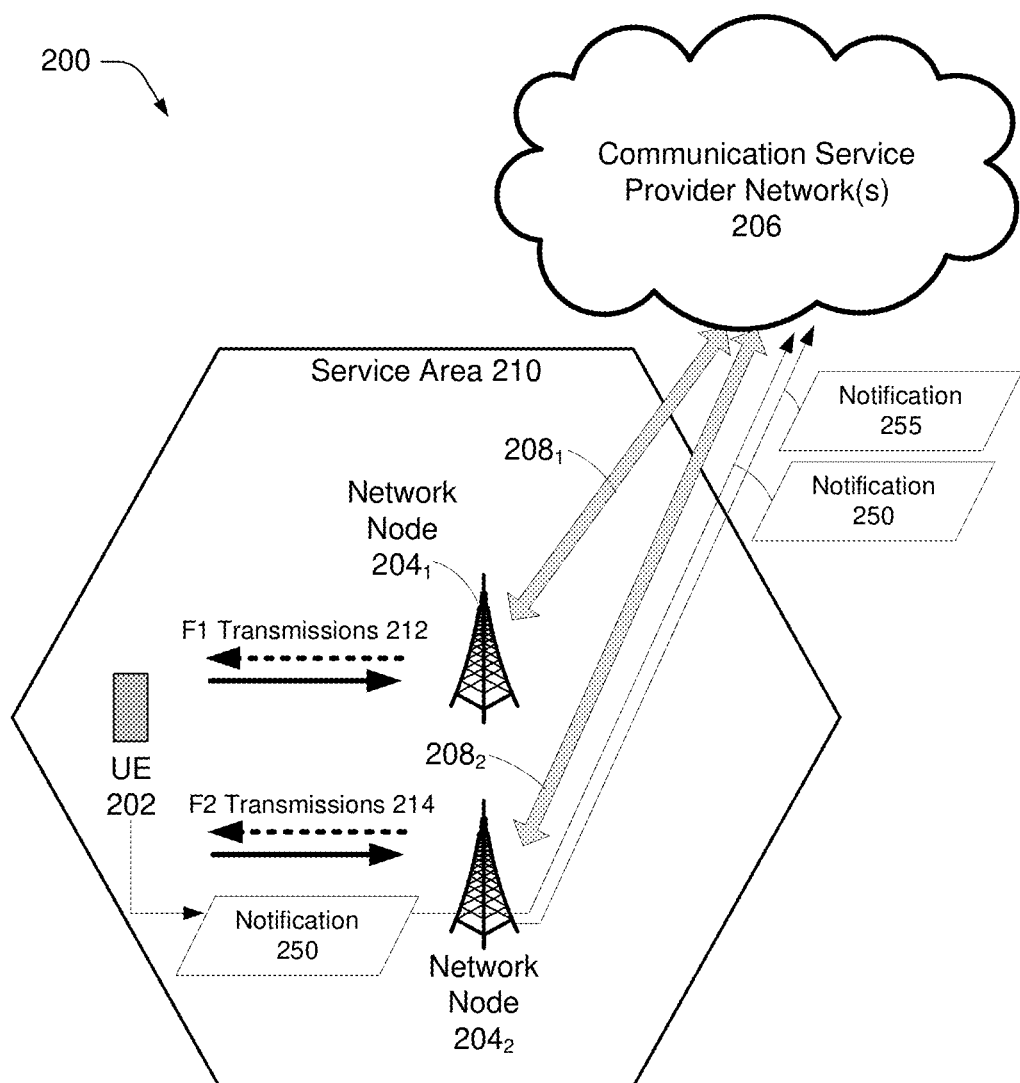
FIG. 2 illustrates a first example scenario in which a user equipment (UE) communicates with a radio access network (RAN) using multiple different frequencies, in accordance with various aspects and embodiments of the subject disclosure.

FIG. 2 illustrates a first example scenario in which a user equipment (UE) communicates with a radio access network (RAN) using multiple different frequencies, in accordance with various aspects and embodiments of the subject disclosure. FIG. 2 includes a wireless communication system 200 comprising components which are analogous to the components introduced in FIG. 1, and the description of like components in FIG. 1 can be applied to like components in FIG. 2. The wireless communication system 200 includes an example UE 202, network nodes $204_1$ and $204_2$ which provide cellular communication service in a service area 210, backhaul links $208_1$ and $208_2$, and communication service provider network(s) 206. While the network nodes $204_1$ and $204_2$ are illustrated as different antenna masts in FIG. 2, in some embodiments, 4G and 5G antennas can be located on a same antenna mast as will be appreciated.

In the first example scenario illustrated in FIG. 2, the network node $204_1$ can comprise, e.g., a 4G network node, and the network node $204_2$ can comprise, e.g., a 5G network node. The UE 202 can initially communicate with the network node $204_1$ using F1 transmissions 212, and the UE 202 can subsequently communicate with the network node $204_2$ using F2 transmissions 214. The F1 transmissions can use a first frequency band, e.g., a 4G frequency band, and the F2 transmissions can use a second frequency band, e.g., a 5G frequency band.

In response to the change of frequency band from F1 to F2, the UE 202 can be adapted to send a notification 250 to the communication service provider network(s) 206, in order to inform the communication service provider network(s) 206 of the change of frequency band. The network node $204_2$ can relay the notification 250 to the communication service provider network(s) 206. The communication service provider network(s) 206 can be configured to adjust wireless communication service for the UE 202 in response to the notification 250, as described herein.

In an alternative embodiment, in response to the change of frequency band from F1 to F2, the network node $204_2$ can be adapted to send a notification 255 to the communication service provider network(s) 206, in order to inform the communication service provider network(s) 206 of the change of frequency band. The communication service provider network(s) 206 can be configured to adjust wireless communication service for the UE 202 in response to the notification 255, as described herein.

Just as the UE 202 and/or the network node $204_2$ can be configured to notify the communication service provider network(s) 206 in response to the change of frequency band from F1 to F2, the UE 202 and/or the network node $204_1$ can be configured to notify the communication service provider network(s) 206 in response to a change of frequency band from F2 to F1.

Furthermore, it should be noted that in so-called "dual mode" or "non-standalone" configurations, the UE 202 may maintain 4G and 5G communications, with network nodes $204_1$ and $204_2$, simultaneously. For example, control plane communications of the UE 202 can remain with the network node $204_1$, while user plane communications may shift back and forth between network nodes $204_1$ and $204_2$. Thus, in an embodiment, the notifications 250 and 255 can be in response to a change of the frequency band used for a portion of UE 202 communications, e.g., the frequency band used for user-plane communications.

While the example network nodes $204_1$ and $204_2$ are described as a 4G and a 5G node, respectively, it is appreciated that cellular communications standards will continue to evolve. As such, FIG. 2 contemplates any two network nodes that implement different cellular communications standards, such as 4G and 5G, or 5G and 6G, etc.

Figure 3:
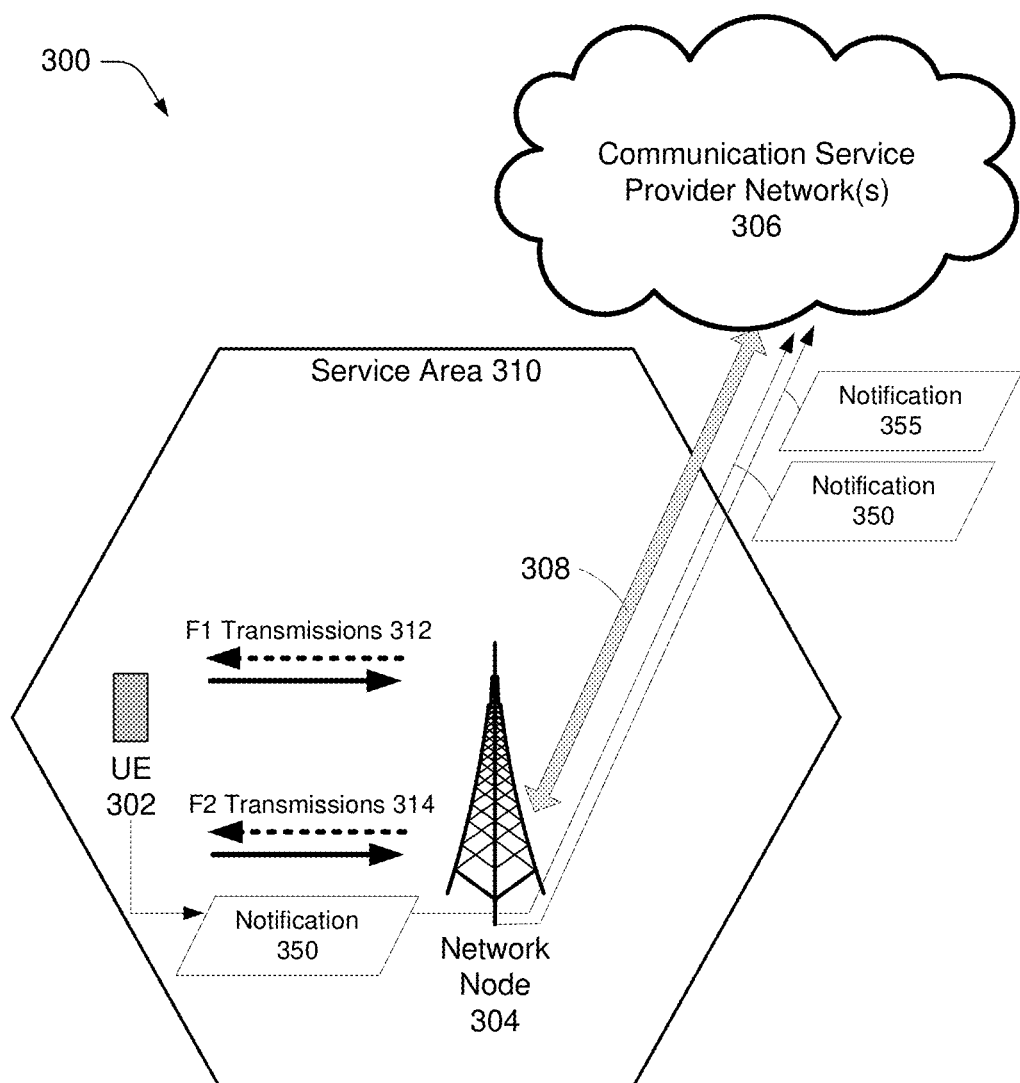
FIG. 3 illustrates a second example scenario in which a user equipment (UE) communicates with a radio access network (RAN) using multiple different frequencies, in accordance with various aspects and embodiments of the subject disclosure.

FIG. 3 illustrates a second example scenario in which a user equipment (UE) communicates with a radio access network (RAN) using multiple different frequencies, in accordance with various aspects and embodiments of the subject disclosure. FIG. 3 includes a wireless communication system 300 comprising components which are analogous to the components introduced in FIG. 1, and the description of like components in FIG. 1 can be applied to like components in FIG. 3. The wireless communication system 300 includes an example UE 302, a network node 304 which provides cellular communication service in a service area 310, a backhaul link 308, and communication service provider network(s) 306.

In the second example scenario illustrated in FIG. 3, the network node 304 can comprise, e.g., a 5G network node which is capable of communicating via multiple different 5G frequency bands. The 5G network node can optionally use multiple different antennas for use with the different frequency bands. The UE 202 can initially communicate with the network node 304 using F1 transmissions 312, and the UE 302 can subsequently communicate with the network node 304 using F2 transmissions 314. Similar to the scenario illustrated in FIG. 2, the F1 transmissions can use a first frequency band, e.g., a first 5G frequency band, and the F2 transmissions can use a second frequency band, e.g., a second 5G frequency band.

In response to the change of frequency band from F1 to F2, the UE 302 can be adapted to send a notification 350 to the communication service provider network(s) 306, in order to inform the communication service provider network(s) 306 of the change of frequency band. The network node 304 can relay the notification 350 to the communication service provider network(s) 306. The communication service provider network(s) 306 can be configured to adjust wireless communication service for the UE 302 in response to the notification 350, as described herein.

In an alternative embodiment, in response to the change of frequency band from F1 to F2, the network node 304 can be adapted to send a notification 355 to the communication service provider network(s) 306, in order to inform the communication service provider network(s) 306 of the change of frequency band. The communication service provider network(s) 306 can be configured to adjust wireless communication service for the UE 302 in response to the notification 355, as described herein.

Just as the UE 302 and/or the network node 304 can be configured to notify the communication service provider network(s) 306 in response to the change of frequency band from F1 to F2, the UE 302 and/or the network node 304 can be configured to notify the communication service provider network(s) 306 in response to a change of frequency band from F2 to F1.

Furthermore, as in the case of "dual mode" or "non-standalone" configurations, the UE 302 may maintain 5G communications at several different frequency bands simultaneously. For example, control plane communications of the UE 302 can remain at F1, while user plane communications may shift back and forth between F1 and F2. Thus, in an embodiment, the notifications 350 and 355 can be in response to a change of the frequency band used for a portion of UE 302 communications, e.g., the frequency band used for user-plane communications.

While the example network node 304 is described as a 5G node, it is appreciated that cellular communications standards will continue to evolve. As such, FIG. 3 contemplates a network node of any generation of cellular communications standard which can communicate via multiple different frequency bands.

In early 5G deployment, LTE-5G dual connectivity can allow network operators to leverage the LTE network coverage and throughput for better user experience. With LTE-NR dual connectivity, a 5G UE can simultaneously connect to 5G NR and LTE eNB. The 5G frequency bands can be, e.g., mmWave frequency bands (wide bandwidth, hundreds of MHz or more) or low frequency NR bands (e.g. LTE or UMTS licensed bands). When a UE provisions on a 5G network, it can be desirable to differentiate service plans based on customer use of mmWave 5G NR, or lower frequency 5G NR bands. Embodiments of this disclosure can be used to support such service plan differentiation.

In an example "coverage based" solution according to this disclosure, a UE 202 or 302 can send notification 250 or 350 to a core network, implemented by communication service provider network(s) 206 or 306, in response to UE 202 or 302 movements in and out of mmWave coverage. The core network implemented by communication service provider network(s) 206 or 306 can adjust speed tiers, and speed tier policies, for the UE 202 or 302 in response to the notification 250 or 350, with minimal signaling overhead.

In an example "network based signaling enhancement" solution according to this disclosure, a network node $204_1$, $204_2$, or 304 can send notification 255 or 355 to a core network, implemented by communication service provider network(s) 206 or 306. The notification 255 or 355 can inform the core network about the frequency band and the spectrum bandwidth that the UE 202 or 302 is currently using. In response to the notification 255 or 355, the core network implemented by communication service provider network(s) 206 or 306 can dynamically adjust tiered speed policies on the UE 202 or 302 in real-time. An enhanced network interface comprising a real time interface between network elements, to exchange real time information, can be used to differentiate which NR frequency band and which aggregated bandwidth service is provided to a UE, enabling real-time policy adjustment.

In an example 5G LTE-NR dual connectivity option 3× network architecture, a SCell for NR can be either mmWave n260 or Sub3 GHz n5, depending in part on the use cases and/or availability of NR cell coverage. In order to improve service management, embodiments of this disclosure can inform mobile core network element(s), at communication service provider network(s) 206 or 306, of which NR band the SCell is using. The mmWave NR band is targeted for eMBB (enhanced mobile broadband) use cases, providing high data rates and extensive bandwidth resources which are significantly faster than current LTE throughputs. The sub 3 GHz NR band, meanwhile, provides coverage and throughput that can be similar to current LTE coverage and throughput.

In an aspect, this disclosure provides enhanced UE RF resource usage reporting to the core network, in order to notify the core network, i.e., the communication service provider network(s) 206 or 306, regarding which NR band the UE 202 or 302 is using. As a result of the enhanced UE RF resource usage reporting, the core network can better differentiate service tiers for the UE 202 or 302, based on expected data throughput. Furthermore, when the UE 202 or 302 is in mmWave coverage, and a call is set up, the core network can add a mmWave link to achieve high speed for the UE 202 or 302. Notifications of mmWave coverage at the UE 202 or 302 can provide an indication for speed tier adjustment by the core network at the communication service provider network(s) 206 or 306.

In an example embodiment, the notification 250 or 350 can comprise a non-access stratum (NAS) notification, e.g., an {in, out} notification, by which the UE 202 or 302 can indicate to a mobility management entity (MME) within the core network/communication service provider network(s) 206 or 306, when the UE 202 or 302 moves in and out of mmWave coverage. When UE 202 or 302 moves into mmWave coverage, the UE 202 or 302 can send a notification 250 or 350 to the MME via a NAS message, thereby indicating to the core network an opportunity to adjust speed tiers as appropriate for mmWave coverage. When UE 202 or 302 moves out of mmWave coverage, UE 202 or 302 can send a notification 250 or 350 to the MME via a NAS message, indicating the core network an opportunity to adjust speed tiers as appropriate for non mmWave coverage. Optionally, in some embodiments, the core network can also send frequency band inquiries to UE 202 or 302, in order to request a notification 250 or 350 of whether the UE 202 or 302 is within mmWave coverage.

Figure 4:
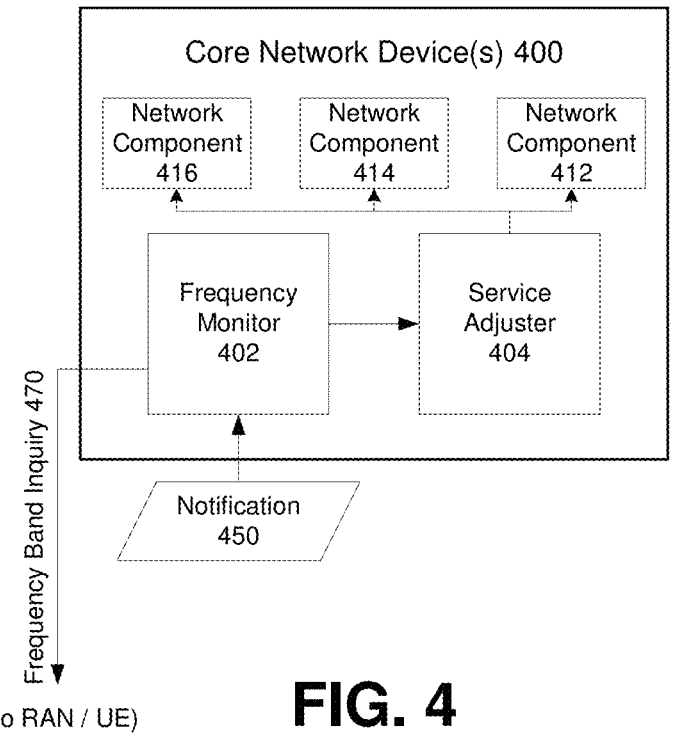
FIG. 4 provides a first example of core network device(s), in accordance with various aspects and embodiments of the subject disclosure.

FIG. 4 provides a first example of core network device(s), in accordance with various aspects and embodiments of the subject disclosure. The example core network device(s) 400 can be included in communication service provider network(s) 206 or 306. The core network device(s) 400 can include, e.g., a frequency monitor 402, a service adjuster 404, and various other example network components 412, 414, and 416.

In an example, the frequency monitor 402 can be configured to receive notifications, such as notification 450, of UE frequency changes. The notification 450 can comprise, e.g., any of the notifications 250, 255, 350, 355 illustrated in FIG. 2 and FIG. 3. In response to a notification 450, the frequency monitor 402 can be configured to notify the service adjuster 404 regarding the information included in the notification 450, namely, regarding a frequency change experienced by a particular identified UE. The service adjuster 404 can be configured to responsively adjust service for the identified UE, as appropriate for the new/current frequency band used for communications between the UE and the RAN. The service adjuster 404 can adjust service for the identified UE for example by adjusting parameters used by network components 412, 414, and 416.

In some embodiments, the frequency monitor 402 can be configured to request notifications such as notification 450 from UEs or RAN devices. The frequency monitor 402 can send frequency band inquiries, such as frequency band inquiry 470, to UEs or to RAN devices. The frequency band inquiry 470 can for example request an identification of a current frequency band used for communications between the UE and the RAN. In some embodiments, the frequency monitor 402 can send frequency band inquiries to UEs/RAN devices at periodic intervals. In other example embodiments, the frequency monitor 402 can send frequency band inquiries to UEs/RAN devices in response to certain conditions, e.g., in response to a UE displacement or a change of a RAN base station used to communicate with a UE.

Figure 5:
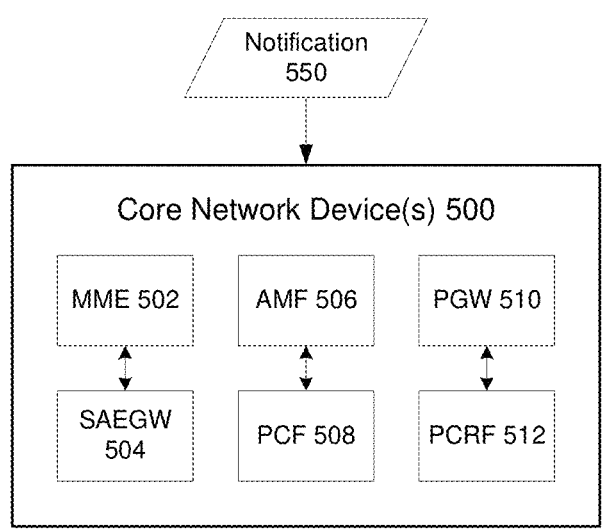
FIG. 5 provides a second example of core network device(s), in accordance with various aspects and embodiments of the subject disclosure.

FIG. 5 provides a second example of core network device(s), in accordance with various aspects and embodiments of the subject disclosure. The example core network device(s) 500 can be included in communication service provider network(s) 206 or 306. The core network device(s) 500 also provide an example implementation of the core network device(s) 400 illustrated in FIG. 4, and as such, the core network device(s) 500 can provide the functions described in connection with FIG. 4. The core network device(s) 500 include, e.g., a mobility management entity (MME) 502, a system architecture evolved gateway (SAEGW) 504, an access and mobility management function (AMF) 506, a policy control function (PCF) 508, a packet data gateway (PGW) 510, and a policy and charging rules function (PCRF) 512.

In an example, the core network devices 500 can be configured to receive notifications, such as notification 550, of UE frequency changes. The notification 550 can comprise, e.g., any of the notifications 250, 255, 350, 355, 450 illustrated in FIG. 2, FIG. 3, and FIG. 4. In response to a notification 550, the core network devices 500 can be configured to responsively adjust service for the UE identified in the notification 550, as appropriate for the new/current frequency band used for communications between the identified UE and the RAN. Depending on the embodiment, the core network devices 500 can be employed in the scenario illustrated in FIG. 2, the scenario illustrated in FIG. 3, or both. Some of the elements illustrated in FIG. 5 can be employed for dual mode scenarios illustrated in FIG. 2, while others of the elements illustrated in FIG. 5 can be employed for 5G scenarios illustrated in FIG. 3.

This disclosure proposes a network based signaling enhancement to notify, via notification 550, the core network device(s) 500 about the frequency band and the spectrum bandwidth that is currently in use at an identified UE. Hence, the core network device(s) 500 can dynamically adjust tiered speed policies on the identified UE in real-time. Any of a variety of notification mechanisms and responsive actions by core network device(s) 500 can be used to implement this disclosure.

In one example, current S1 application protocol (S1AP) messages can be enhanced to serve as notifications 550, so that an eNB can convey active UE NR operating bands and UE spectrum bandwidth to the MME 502. S1AP messages can be enhanced for example by adding a UE identifier as well as current frequency band information that identifies a current frequency band used by the identified UE. In some embodiments, a new standalone S1AP message can serve as notification 550 to convey the frequency band and the spectrum bandwidth information which an identified UE is currently using. The standalone S1AP message can be used for example when there are no other S1AP call processing messages that can be triggered naturally by current S1AP procedures, however the eNB is to report a UE frequency change pursuant to the techniques described herein.

In another example, current next generation application protocol (NGAP) messages can be enhanced to serve as notifications 550, so that a gNB can convey active UE NR operating bands and UE spectrum bandwidth to the AMF 506. NGAP messages can be enhanced for example by adding a UE identifier as well as current frequency band information that identifies a current frequency band used by the identified UE. In some embodiments, a standalone NGAP message can serve as notification 550 to convey the frequency band and the spectrum bandwidth information which an identified UE is currently using. The standalone NGAP message can be used for example when there are no other NGAP call processing messages that can be triggered naturally by current NGAP procedures, however the gNB is to report a UE frequency change pursuant to the techniques described herein.

In another example, current S11/S5 messages can be enhanced, so that an MME 502 can convey active NR operating bands and spectrum bandwidth information to the SAEGW 504. S11/S5 messages can be enhanced for example by adding a UE identifier as well as current frequency band information that identifies a current frequency band used by the identified UE. Embodiments of this disclosure can use a standalone S11/S5 modify bearer request message to convey the frequency band and the spectrum bandwidth an identified UE is currently using. The standalone S11/S5 modify bearer request message can be used for example when there is no other S11/S5 call processing messages that can be triggered naturally by current S11/S5 procedures, however the MME 502 is to report a UE frequency change pursuant to the techniques described herein.

In another example, current Gx messages can be enhanced, so that a PGW 510 can convey active NR operating bands and spectrum bandwidth information to the PCRF 512. Gx messages can be enhanced for example by adding a UE identifier as well as current frequency band information that identifies a current frequency band used by the identified UE. Embodiments of this disclosure can use a standalone Gx CCR-U message to convey the frequency band and the spectrum bandwidth an identified UE is currently using. The standalone Gx CCR-U message can be used for example when there are no other Gx call processing messages that can be triggered naturally by current Gx procedures, however PGW 510 is to report a UE frequency change pursuant to the techniques described herein.

In another example, current next generation PCF ($N_{pcf}$) messages can be enhanced so that an AMF 506 can convey active NR operating bands and spectrum bandwidth information to the PCF 508. $N_{pcf}$ messages can be enhanced for example by adding a UE identifier as well as current frequency band information that identifies a current frequency band used by the identified UE. Embodiments of this disclosure can use a standalone $N_{pcf}$ event notification request message to convey the frequency band and the spectrum bandwidth an identified UE is currently using. The standalone $N_{pcf}$ message can be used for example when there are no other $N_{pcf}$ call processing messages that can be triggered naturally by current $N_{pcf}$ procedures, however AMF 506 is to report a UE frequency change pursuant to the techniques described herein.

In some embodiments, based on the frequency band and the spectrum bandwidth used by an identified UE, which information can be provided to a PCRF 512 as described herein, the PCRF 512 can be configured to apply a proper corresponding speed tier policy for the identified UE, generate a charging characteristic for the identified UE, and send both updates to the PGW 510.

Similarly, based on the frequency band and the spectrum bandwidth used by an identified UE, which information can be provided to a PCF 508 as described herein, the PCF 508 can be configured to apply a proper corresponding speed tier policy for the identified UE, generate a charging characteristic for the identified UE, and send both updates to the AMF 506.

Figure 6:
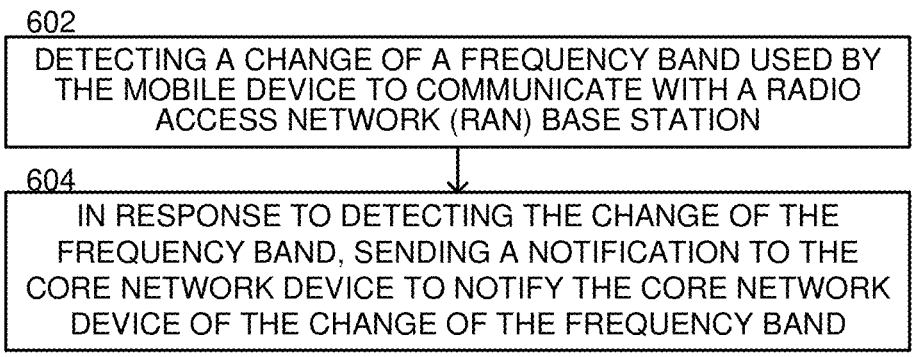
FIG. 6 is a flow diagram representing example operations of a mobile device, in accordance with various aspects and embodiments of the subject disclosure.

FIG. 6 is a flow diagram representing example operations of a mobile device, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 6 can be performed, for example, by a mobile device such as UE 202 or 302. The UE can optionally comprise a dual mode UE, adapted to communicate according to both the 4G and the 5G communication standards, or a UE adapted to communicate via multiple different frequency bands pursuant to the 5G communication standard, or a subsequent communication standard.

Example operation 602 comprises detecting a change of a frequency band used by the mobile device to communicate with a radio access network (RAN) base station, wherein the RAN base station is coupled with a core network device that facilitates provision of cellular communication service to the mobile device. For example, as illustrated in FIG. 2, the UE 202 can detect a change from F1 transmissions 212 to F2 transmissions 214. Similarly, as illustrated in FIG. 3, the UE 302 can detect a change from F1 transmissions 312 to F2 transmissions 314. In some embodiments, a UE 202 or 302 can monitor its radio use to detect the frequency change. In other embodiments, the UE 202 or 302 can detect frequency use in response to a received frequency band inquiry, such as frequency band inquiry 470.

In the scenario illustrated in FIG. 2, the mobile device (UE 202) is adapted to communicate via a previous generation wireless protocol, such as 4G, and a subsequent generation wireless protocol, such as 5G, and the change of the frequency band is associated with a change of wireless protocol (e.g., from 4G to 5G or vice versa) by the UE 202. In the scenario illustrated in FIG. 3, the mobile device (UE 302) is adapted to communicate via a wireless protocol that supports multiple different frequency bands, such as 5G, and the change of the frequency band comprises a switch from one of the multiple different supported frequency bands to another of the multiple different supported frequency bands.

In either scenario, the change of the frequency band can comprise a change from a higher frequency band, e.g., a frequency band at or above 25 GHz, to a lower frequency band, e.g., a frequency band at or below 7 GHz. Conversely, the change of the frequency band can comprise a change from a lower frequency band at or below 7 GHz to a higher frequency band at or above 25 GHz.

Example operation 604 comprises, in response to detecting the change of the frequency band at operation 602, sending a notification to the core network device to notify the core network device of the change of the frequency band. For example, the UE 202 or 302 can send a notification 250 or 350 to a core network device at communication service provider network(s) 206 or 306, to notify the core network device of the change of the frequency band from F1 to F2 or vice versa.

In an example implementation, the notification 250 or 350 to the core network device can comprise a non-access stratum (NAS) notification. In another example aspect, sending the notification to the core network device can comprises sending the notification to a MME or an AMF at the core network device, e.g., to an MME 502 or AMF 506 such as illustrated in FIG. 5.

Figure 7:
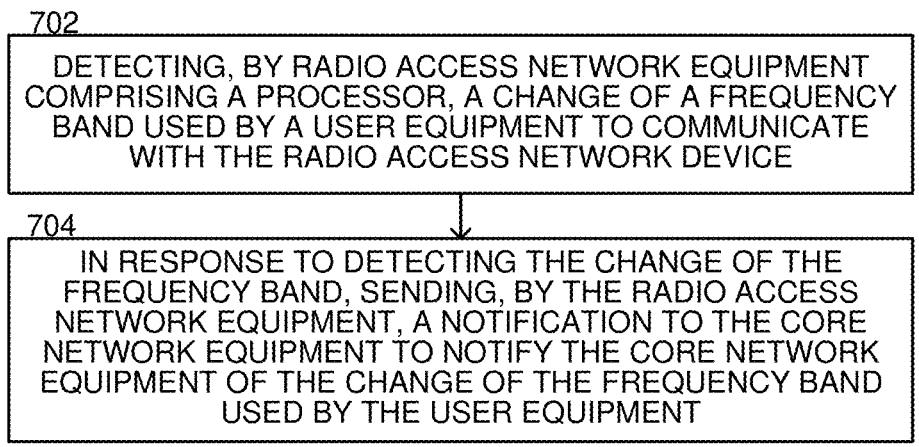
FIG. 7 is a flow diagram representing example operations of radio access network equipment, in accordance with various aspects and embodiments of the subject disclosure.

FIG. 7 is a flow diagram representing example operations of a radio access network equipment, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by a RAN device or other equipment comprising a processor, such as a device at network node 204₁, 204₂, or 304. Example operation 702 comprises detecting, by the RAN equipment, a change of a frequency band used by a user equipment to communicate with the RAN equipment. For example, with reference to FIG. 2 and FIG. 3, the RAN equipment at network node 204₁, 204₂, or 304 can detect a change of a frequency band used by a user equipment 202 or 302 to communicate with the RAN equipment. The RAN equipment is coupled with a core network equipment, e.g., a device among communication service provider network(s) 206 or 306, which facilitates provision of cellular communication service to the user equipment 202 or 302.

Example operation 704 comprises, in response to detecting the change of the frequency band, sending, by the RAN equipment, a notification 255 or 355 to the core network equipment to notify the core network equipment of the change of the frequency band used by the user equipment 202 or 302. In some embodiments, the RAN equipment can comprise an eNB device and the notification 255 or 355 to the core network equipment can comprise an S1 application protocol (S1AP) message. In other embodiments, the RAN equipment can comprise a gNB device, and the notification to the core network equipment can comprises a next generation, or NextGen, or NG application protocol (NGAP) message.

Furthermore, in a scenario such as illustrated in FIG. 3, the RAN equipment at network node 304 can be adapted to communicate via a wireless protocol, such as 5G, that supports multiple different frequency bands. The change of the frequency band detected at operation 702 can comprise a switch from one of the multiple different supported frequency bands (e.g., a low frequency 5G band, or a high frequency 5G band) to another of the multiple different supported frequency bands. In a scenario such as illustrated in FIG. 2, detecting the change of frequency band used by a user equipment, at operation 702, can comprise detecting a switch from UE communications with a previous RAN equipment (e.g., a device at network node $204_1$) to UE communications with a subsequent RAN equipment (e.g., a device at network node $204_2$).

Furthermore, the change of the frequency band, detected at operation 702, can comprise a change from a higher frequency band, e.g., at or above 25 GHz, to a lower frequency band, e.g., at or below 7 GHz. Conversely, the change of the frequency band can comprise a change from a lower frequency band, at or below 7 GHz, to a higher frequency band at or above 25 GHz.

Figure 8:
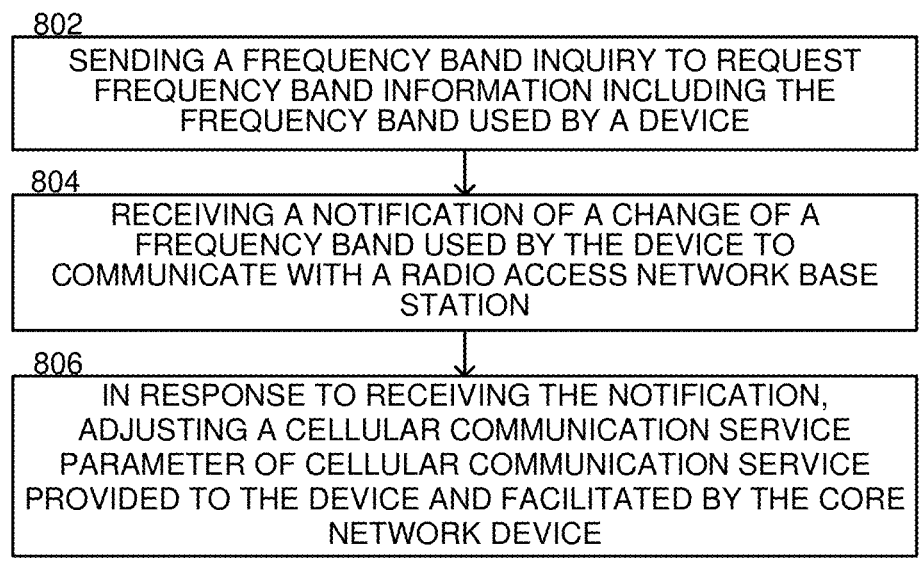
FIG. 8 is a flow diagram representing example operations of a core network device, in accordance with various aspects and embodiments of the subject disclosure.

FIG. 8 is a flow diagram representing example operations of a core network device, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by core network device(s) 400 or 500, illustrated in FIG. 4 and FIG. 5, respectively. Core network device(s) 400 or 500 can in turn be incorporated into communication service provider network(s) 206 or 306, illustrated in FIG. 2 or FIG. 3, respectively.

Example operation 802 comprises sending a frequency band inquiry to request frequency band information including the frequency band used by a device. Operation 802 is optional, and need not be included in all embodiments. For example, operation 802 can be included in embodiments adapted for use with UEs that are not necessarily configured to proactively send frequency change notifications to the core network. In such scenarios, the core network device(s) 400 or 500 can send frequency band inquiries, such as frequency band inquiry 470, to one or more UEs. Such frequency band inquiries can be sent periodically or in response to certain events, as described herein.

Example operation 804 comprises receiving a notification of a change of a frequency band used by the device to communicate with a radio access network (RAN) base station. For example, core network device(s) 400 or 500 can receive a notification 450 or 550, as described herein, notifying the core network device(s) 400 or 500 of a change of a frequency band used by a UE 202 or 302 to communicate with a RAN base station such as $204_1$, $204_2$, or 304.

In some embodiments, e.g., as illustrated in FIG. 5, the core network device(s) can provide an MME 502 or an AMF 506, and the notification 550 of the change of the frequency band used by the device is received at the MME 502 or the AMF 506.

Example operation 806 comprises, in response to receiving the notification at operation 804, adjusting a cellular communication service parameter of cellular communication service provided to the device and facilitated by the core network device. For example, core network device(s) 400 or 500 can adjust cellular communication service parameters of network components illustrated in FIG. 4 and FIG. 5, in order to adjust the cellular communication service provided to the UE 202 or 302 by the core network device(s) 400 or 500.

Adjusting a cellular communication service parameter at operation 806 can comprise any of a wide variety of operations. For example, in one example, adjusting the cellular communication service parameter can comprise conveying the change of the frequency band used by the mobile device to a PGW 510. In another example, adjusting the cellular communication service parameter can comprise adjusting a speed tier policy for the mobile device. In another example, adjusting the cellular communication service parameter can comprise adjusting a charging characteristic for the mobile device. In another example, adjusting the cellular communication service parameter can comprise adjusting digital content for delivery to the mobile device, e.g., changing a video setting from lower definition to higher definition, or vice versa.

Figure 9:
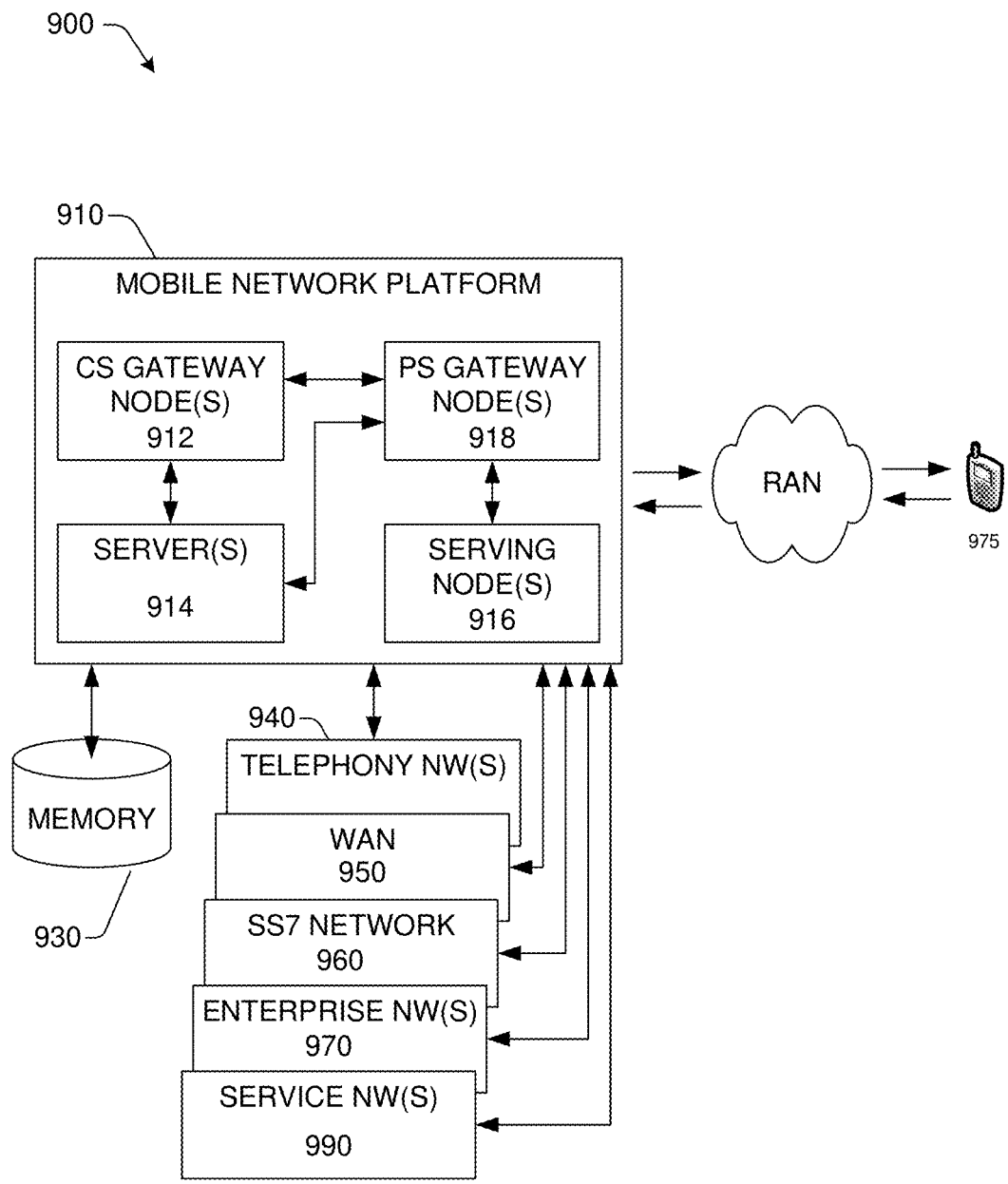
FIG. 9 illustrates an example mobile network platform, in accordance with various aspects and embodiments of the subject disclosure.

FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, PGWs, and various other components disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless network platform 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
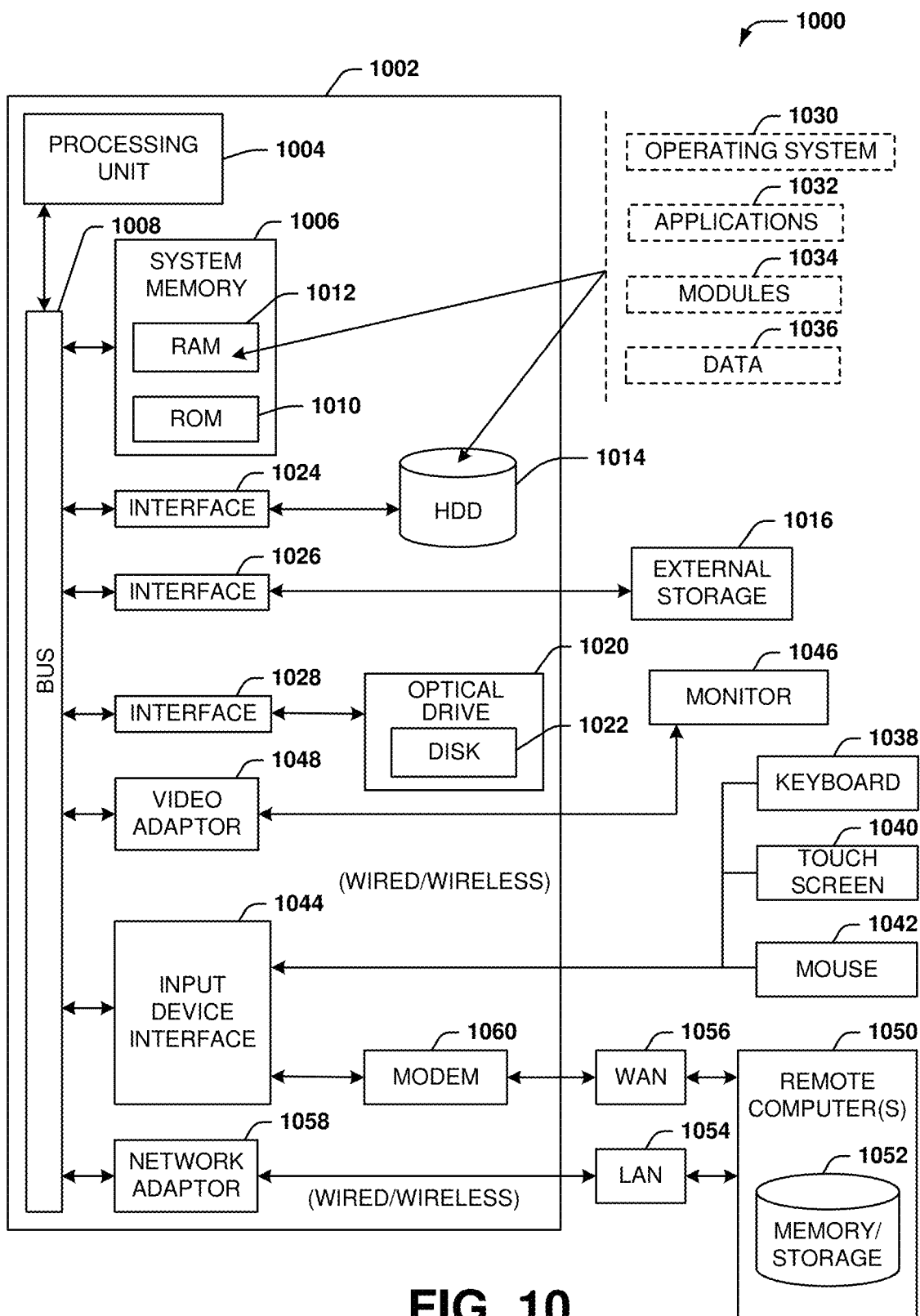
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, a mobile device 202 or 302, a RAN device at any of network nodes 204$_1$, 204$_2$, or 304, or a core device included among core network device(s) 400 or 500, or other computing devices described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities.

Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A core network device, comprising:
a processor; and
a memory that stores executable instructions that, when executed by the processor, facilitate performance of operations, comprising:
receiving, from a mobile device, a notification of a change from a first cellular communication frequency band to a second cellular communication frequency band used by the mobile device to communicate with a cellular communication service, wherein the core network device is associated with provision of the cellular communication service; and
in response to receiving the notification, adjusting a parameter of the cellular communication service, wherein the parameter is applicable to the cellular communication service provided to the mobile device.

2. The core network device of claim 1, wherein the operations further comprise sending a frequency band inquiry to the mobile device in order to request frequency band information comprising the frequency band used by the mobile device.

3. The core network device of claim 1, wherein the notification is received at a mobility management entity or an access and mobility management function of the core network device.

4. The core network device of claim 1, wherein adjusting the parameter of the cellular communication service comprises sending a communication to a packet data network gateway.

5. The core network device of claim 1, wherein adjusting the parameter of the cellular communication service comprises adjusting a speed tier policy for a communication speed of the mobile device.

6. The core network device of claim 1, wherein adjusting the parameter of the cellular communication service comprises adjusting a charging characteristic for the mobile device.

7. The core network device of claim 1, wherein adjusting the parameter of the cellular communication service comprises adjusting digital content for delivery to the mobile device.

8. A non-transitory machine-readable medium, comprising executable instructions that, when executed by a processor of a user equipment, facilitate performance of operations, comprising:
detecting a change from a first cellular communication frequency band to a second cellular communication frequency band, wherein the first cellular communication frequency band and the second cellular communication frequency band are used to communicate with radio access network equipment, wherein the radio access network equipment is coupled with core network equipment; and
in response to detecting the change from the first cellular communication frequency band to the second cellular communication frequency band, sending a notification to the core network equipment to notify the core network equipment of the change from the first cellular communication frequency band to the second cellular communication frequency band.

9. The non-transitory machine-readable medium of claim 8, wherein the radio access network equipment comprises an evolved node B device.

10. The non-transitory machine-readable medium of claim 8, wherein the radio access network equipment comprises a gNode B device configured to communicate according to at least a fifth generation network communication protocol.

11. The non-transitory machine-readable medium of claim 8, wherein the radio access network equipment is adapted to communicate via a communication protocol that supports multiple different frequency bands, and wherein the change from the first cellular communication frequency band to the second cellular communication frequency band comprises a switch from one of the multiple different frequency bands to another of the multiple different frequency bands.

12. The non-transitory machine-readable medium of claim 8, wherein the change from the first cellular communication frequency band to the second cellular communication frequency band comprises a change from a higher frequency band at or above 25 gigahertz to a lower frequency band at or below 7 gigahertz.

13. The non-transitory machine-readable medium of claim 8, wherein the change from the first cellular communication frequency band to the second cellular communication frequency band comprises a change from a lower frequency band at or below 7 gigahertz to a higher frequency band at or above 25 gigahertz.

14. A method, comprising:
receiving, by a processing system of a core network device including a processor, and from a mobile device, a notification of a change from a first cellular communication frequency band to a second cellular communication frequency band used by the mobile device to communicate with a cellular communication service, wherein the core network device is associated with provision of the cellular communication service; and
in response to receiving the notification, modifying, by the processing system, a parameter of the cellular communication service, wherein the parameter is applicable to the cellular communication service provided to the mobile device.

15. The method of claim 14, further comprising sending, by the processing system, a frequency band inquiry to the mobile device in order to request frequency band information comprising the frequency band used by the mobile device.

16. The method of claim 14, wherein the notification is received at a mobility management entity or an access and mobility management function of the core network device.

17. The method of claim 14, wherein modifying the parameter of the cellular communication service comprises sending a communication to a packet data network gateway.

18. The method of claim 14, wherein modifying the parameter of the cellular communication service comprises adjusting a speed tier policy for a communication speed of the mobile device.

19. The method of claim 14, wherein modifying the parameter of the cellular communication service comprises adjusting a charging characteristic for the mobile device.

20. The method of claim 14, wherein modifying the parameter of the cellular communication service comprises adjusting digital content for delivery to the mobile device.

* * * * *